United States Patent Office 2,698,936
Patented Jan. 4, 1955

2,698,936

ETHERIFICATION OF STARCH

Max A. Staerkle, Baech, and Emil Meier, Waedenswil, Switzerland, assignors to Blattmann & Co., Zurich, Switzerland, a firm of Switzerland No Drawing. Application February 1, 1951, Serial No. 208,971

9 Claims. (Cl. 260—233.3)

This invention relates to a new and improved process for producing derivatives or condensation products of starch in the nature of those known as starch ethers or acetal derivatives of starch.

An important object of the invention is to provide a process whereby starch can be converted into improved products of that nature having practically any desired combination of solubility and viscosity properties, and which are extraordinarily homogeneous and stable against changes of these properties.

Another object of the invention is to provide a process of producing starch ethers or acetal derivatives of starch at important savings of reagents and processing costs as compared with usual practices.

A further object is to produce products of that character which dry from a state of dispersion in water to form films or deposits having desirable powers of water resistance.

According to this invention, starch in a finely divided form is subjected first to a condensation or etherification reaction by condensing it with an agent such as an aldehyde, chloracetic acids, ethylene oxide, or the like, while continuously dehydrating the material at relatively low temperatures, and the resulting product is then degraded or disintegrated to convert it into a valuable starch ether or acetal derivative of starch by torrefying it at an elevated temperature in a dry non-oxidizing environment.

The treatment is started with a starch powder which may be commercially dry, partially pre-dried or even in a moist condition. The starch powder is impregnated with a suitable condensation or etherification agent, preferably also with a suitable condensation catalyst, and then the condensation reaction is brought about with continuous diminution of the water content of the material by suitably heating the material, preferably under vacuum, at temperatures insufficient of themselves to degrade the starch thermally. This stage of the process produces high molecular condensation products which can be converted into starch ethers or derivatives having almost any desired combination of solubility and viscosity properties by simply torrefying them at more elevated temperatures under a vacuum or in a non-oxidizing gas such as nitrogen, carbon dioxide, sulfur dioxide, or the like.

An aldehyde to enter into the condensation reaction may be furnished by impregnating the starch with an aldehyde at the outset or by introducing an aldehyde, preferably as a fine spray or mist, after the material has been placed under vacuum. Aldehydes suitable for the purpose include formaldehyde, glyoxal, or the like. The addition of an aldehyde as such, however, requires rather accurate control of the impregnation in order that the formation of objectionable hard or granular or heterogeneous products may be avoided; so a preferred procedure, which avoids such difficulties, is to furnish the reactive aldehyde by impregnating the starch with an aldehyde-liberating compound such as paraformaldehyde, hexamethylenetetramine, polyoxymethylene, mono- or polymethylol ureas, aldehyde bisulfite compounds, or the like.

The condensation reaction may also be carried out by impregnating the starch with other known etherification agents. For example, the starch powder may first be impregnated with alkali, preferably by mixing it with a solution of NaOH in alcohol, and after this has reacted homogeneously with the starch the material may be mixed with an agent such as mono- or tri-chloracetic acid, ethylene oxide, diazomethane, or the like. Then the material is subjected to the dehydration process under vacuum.

As the condensation reaction proceeds the water content of the raw starch would be progressively increased by the reaction water which results, but for the fact that water is continuously eliminated from the material at the same time. This elimination of water serves a multiple function in that, first, it accelerates and enhances the efficiency of the condensation reaction by progressively increasing the reactant concentration in the material. Second, while doing this it limits the temperature of the material to the point at which the active evaporation of moisture from the material takes place under the applied vacuum. Third, it brings the material to such a dehydrated condition that it will not paste or form lumps and will respond homogeneously to torrefaction at the elevated temperature used in the second or high temperature stage of the process. In other words, the dehydration is carried so far that substantially no moisture evaporates from the material, hence no under-cooling occurs in it from the latent heat of evaporation of water, while the powdery mass is subjected to the elevated temperatures used for the second reaction stage.

The entire process can be carried out advantageously under vacuum, and in such a practice the material is rendered completely anhydrous or practically so before it is brought to a temperature sufficient to degrade the starch thermally. On the other hand, when the torrefaction is carried out in a non-oxidizing gas instead of a vacuum a lesser degree of dehydration may exist in the material. It is sufficient if its "free water" content has been practically entirely eliminated before the material is exposed to a torrefaction temperature; the "free water" content including reaction water produced by the aldehyde condensation but not including the bound or chemically combined water that does not evaporate at the temperatures of the torrefaction. In general, starches which no longer give off water under heating at temperatures of about 60° to 125° C. (under normal pressure) can still be made to yield measurable quantities of water, sometimes up to nearly 7% of their weight, when exhaustively tested in known manner at a temperature of 160° C.

When starting the process with commercially dry to moist starch and operating under vacuum the water elimination will have proceeded to the required extent after about 2 to 4 hours of heating. Without vacuum a much longer heating period would be required. When the water content of the material is sufficiently reduced its temperature is raised gradually to a point sufficient to complete the condensation reaction. In general, this temperature is between 60° and 125° C., but it depends upon the particular condensation agent used. It will be understood that when an aldehyde-liberating compound is used the reaction temperature must be high enough to cause it to liberate an aldehyde for the condensation reaction.

The condensation reaction can be carried out without the addition of a catalyst, especially since the starch itself usually develops a degree of acidity tending to catalyze the reaction. On the other hand, such an addition accelerates the process; so it is advantageous to add a small amount of an aldehyde condensation catalyst to the starting material. This may be any suitable substance of the types used for catalyzing urea-formaldehyde condensations, including acids, bases and salts of acid, neutral or alkaline reaction. When catalyzed by acid the condensation is more intensive and leads to final products having relatively greater water resistance, while alkaline condensation tends to make the products relatively "longer" and more gelatinous. Not more than a small amount of catalyst need ever be used, for the condensation proceeds actively due to the strengthening of the aldehyde reaction as the water content of the material is diminished.

The products formed in the first stage of this process have larger molecular structures than the raw starch. Those prepared by the use of alkaline, neutral or mildly acid catalysts show a capacity for water absorption and swelling much greater than that of raw starch. Those prepared by use of stronger acid catalysts are almost if not entirely insoluble in water, although some of them may swell greatly. Those formed by neutral or alkaline catalysis are able not only to swell but also to gelatinize in water, forming dispersion or pastes having pronounced and unusually stable gelatinous properties.

In order to obtain final products having desired solubility and viscosity properties, the dehydrated condensation products formed in the first reaction stage are next disintegrated homogeneously simply by subjecting them to thermal degradation or torrefaction in a non-oxidizing environment as mentioned above. For this purpose they are heated in a vacuum or a non-oxidizing gas to a suitable temperature between 130° and 180° C., the temperature and duration of the heating being selected according to the degree of disintegration desired in the final product. When a desired degree of disintegration has been reached, the product is cooled in the same non-oxidizing environment. Virtually a 100% yield of a white powdery starch ether having the desired properties is regularly obtained.

Many of the catalysts used in the process here disclosed not only have an accelerating effect on condensation, but also have a hydrolyzing action on the starch. Accordingly, it is also possible to subject to the present process starch which has been chemically pretreated, whether such pretreatment took place in an alkaline or an acid environment. Thus, for instance, the starch can be impregnated with alcoholic sodium hydroxide and—preferably only after homogeneous reaction with the starch—brought to condensation with the desired etherification agents or other agents such as acetal-forming media and the like. Similarly, starch pretreated by physical means, as for instance by ultrasonic methods or by fine grinding, can be subjected to the above-described process. Accordingly, the term "starch" when used herein without special qualification comprehends chemically or physically pretreated or modified starches, as well as raw starches and the like.

The effect of the torrefaction stage is to break down homogeneously the large molecular structures of the relatively insoluble dehydrated condensation products, thus converting them into derivatives which can possess any desired degree of solubility, up to 100% solubility in cold water, depending upon the temperature and duration of the heating employed. These derivatives possess an extraordinary degree of homogeneity and they are quite free of the oxidation products or discolorations normally found in the nearest comparable products of conventional processes. Furthermore, the products obtained according to this process possess an extraordinary stability which enables them to be kept in aqueous dispersions or solutions for days or even weeks. Dispersions or solutions containing them show remarkably little variation of viscosity or thickness under variations of pH in the liquid media, being highly resistant both to alkalinity and to mild acidity.

Further attributes of these improved products include their stronger resistance to attack by biological agents such as bacteria, molds, or the like, and their ability in some cases to form water-resistant films or deposits by being dried from a state of dispersion or solution in water. The properties of these products make them exceptionally useful in paper coatings, as tub sizings, as binders for molding sands, as wall paper adhesives, as thickeners for textile printing compositions, and for other purposes.

The process of this invention can be applied with similar effects to all kinds of starches, including corn starch, wheat starch, potato starch, cassava starch, and others. It can be applied to starches which have been treated or modified before being subjected to this process, as well as to native starches. It can be carried out completely in a single closed container or autoclave provided with suitable stirring means and suitable heating and cooling means. For the vacuum operation a low vacuum of the order produced by common vacuum pumps is sufficient, the degree of vacuum used being primarily influential upon the duration and temperature of the heating in the first reaction stage.

The following examples illustrate preferred ways of practicing the invention:

*Example 1.*—250 kg. of corn starch powder impregnated with 1.2 litres of a 38% formaldehyde solution are placed under a 90 to 93% vacuum in a closed container equipped to be heated or cooled at desired temperatures and provided with continuously operative stirring means. After establishing the vacuum, 140 grams of HCl gas are introduced to impregnate the starch and catalyze the aldehyde condensation. The material is then heated gradually to 110° C. under continued vacuum over a period of about 3 hours. During this period the free water content is gradually driven off, and the material attains a removable moisture content of about 1 to 4%. While continuing the vacuum, the material is then heated more rapidly to 145° C. and is held at that temperature until the desired degree of disintegration has been obtained, whereupon it is cooled under vacuum in the same container. When the temperature has risen to about 130° C. the material no longer gives off any appreciable amount of water.

The product thus obtained is soluble in boiling water and has a viscosity like that of so-called "thin-boiling" starch, but in contrast to the latter it forms dispersions having a very high degree of stability against viscosity changes, and these dispersions dry to form films or deposits having pronounced properties of water resistance.

*Example 2.*—400 kg. of commercially dry potato starch powder are mixed thoroughly with 760 grams of finely divided paraformaldehyde. The mixture is placed under vacuum in a closed container and impregnated with 100 grams of HCl gas, as described in Example 1. The material is then heated gradually to 100° C. under vacuum, during a period of 3½ hours. Water is continuously driven off during this period and the removable moisture content of the material is reduced to about 2 to 5%. While continuing the vacuum, the temperature of the material is then raised more rapidly to about 160° C., the material meanwhile being rendered substantially completely anhydrous, and heating is continued at that temperature for about 1 to 1½ hours, until a sample of the product boiled in 6 parts of water shows a degree of thickening similar to that of conventional starch ethers. Then the product is cooled under continued vacuum.

*Example 3.*—200 kilos of maize starch are mixed with a mixture of 10 kilos of NaOH 36° Bé. dissolved in 20 litres of 96% alcohol, then with 20 kg. of monochloracetic acid dissolved in 25 litres of water. The impregnated material is a moist starch powder. It then is heated under vacuum for 2 hours to 100° C. in an autoclave as mentioned above. At the end of this period the removable water content is about 6 to 7%. Then the material is brought under continued vacuum to a temperature of 125° to 145° C. and maintained at the selected temperature until the reaction material has reached the desired degree of conversion, whereupon it is cooled under vacuum. A final heating period of about ½ to 1½ hours generally suffices to yield a valuable etherification product.

*Example 4.*—200 kg. of potato starch in commercially dry form are impregnated with 50 gm. of HCl under vacuum and then subjected for 1½ hours to partial dehydration under conditions of gradual heating to 80° C. Now 800 gm. of paraformaldehyde (technical trioxymethylene) $(HCHO)_x$, are mixed into the mass, the latter is dehydrated by continued heating under vacuum to a residual moisture content of 3–4%, and the vacuum is then replaced by nitrogen.

The material is then heated to about 175° C. and maintained at this temperature until the desired degree of conversion is obtained.

*Example 5.*—100 kg. of wheat starch of about 14% moisture content are impregnated with 1 kilo of technical sodium hydroxide solution (approximately 30%) which has been diluted with 2 litres of ethyl alcohol, and heated under vacuum, under conditions of continuous dehydration, to about 70° C. within one hour; then 600 cc. solution of glyoxal (30%) is mixed into the reaction material, which is then heated to 145° C. under conditions of maintenance of the vacuum, and maintained at this temperature until the desired degree of thickening has been achieved. The final product can be neutralized if desired.

*Example 6.*—800 kg. of corn starch are impregnated with 1.6 litres of 25% ammonia solution and the latter left to act on the starch for 1 hour in an agitator. Then the reaction material is mixed with 850 cc. of 38% formaldehyde solution and gradually, in the course of two hours, heated under vacuum to 120° C. Then the vacuum is abolished by allowing nitrogen gas to flow in, the reaction material is heated to 160° C. and maintained at this temperature until a sample boiled 1:8 exhibits the consistency of a thin ointment. The final product is then cooled in the nitrogen atmosphere.

While the practice of this invention has been exemplified by the specification of various details and examples, it will be understood that these may be varied widely and that substitutions, additions or omissions can be made without departing from the spirit or the scope of the disclosed invention which is intended to be defined by the appended claims.

We claim:

1. A process for producing starch derivatives having selected solubility and viscosity properties, which comprises heating and progressively dehydrating under vacuum a powdery mass of starch containing free moisture and a starch etherification agent and maintaining the material at temperatures below dextrinization temperatures, until the material is substantially rid of free moisture and so anhydrous that substantially no moisture evaporates from it in the ensuing steps, and thereafter, while continuously stirring the dehydrated powdery material and excluding oxygen from it, heating it at substantially increased temperatures sufficient to degrade it thermally until a desired reaction product is formed.

2. A process for producing starch derivatives having selected solubility and viscosity properties, which comprises heating and progressively dehydrating under vacuum a powdery mass of starch containing free moisture and a starch etherification agent and maintaining the material at temperatures below dextrinization temperatures, until the material is substantially rid of free moisture and so anhydrous that substantially no moisture evaporates from it in the ensuing steps, and thereafter, while continuously stirring the dehydrated powdery material, heating it at substantially increased temperatures sufficient to degrade it thermally and in a dry non-oxidizing environment until a desired reaction product is formed and then cooling the product in such environment.

3. A process for producing starch derivatives having selected solubility and viscosity properties, which comprises heating and progressively dehydrating under vacuum a powdery mass of starch containing free moisture and a starch etherification agent and maintaining the material at temperatures below dextrinization temperatures, until the material is substantially completely anhydrous, and thereafter, while continuously stirring the dehydrated powdery material, heating it at substantially increased temperatures sufficient to degrade it thermally and under continued vacuum until a desired reaction product is formed and then cooling the product under continued vacuum.

4. A process for producing starch derivatives having selected solubility and viscosity properties, which comprises heating and progressively dehydrating under vacuum a powdery mass of starch containing free moisture and a starch etherification agent and maintaining the material at temperatures below dextrinization temperatures, until the material is substantially rid of free moisture and so anhydrous that substantially no moisture evaporates from it in the ensuing steps, and thereafter, while continuously stirring the dehydrated powdery material, heating it at substantially increased temperatures sufficient to degrade it thermally and in an inert gas until a desired reaction product is formed and then cooling the product in an inert gas.

5. A process for producing starch derivatives having selected solubility and viscosity properties, which comprises heating and progressively dehydrating under vacuum a powdery mass of starch containing free moisture, a catalyst and a starch etherification agent and maintaining the material at temperatures below dextrinization temperatures, until the material is substantially rid of free moisture and so anhydrous that substantially no moisture evaporates from it in the ensuing steps, and thereafter, while continuously stirring the dehydrated powdery material and excluding oxygen from it, heating it at substantially increased temperatures sufficient to degrade it thermally until a desired reaction product is formed.

6. A process for producing starch derivatives having selected solubility and viscosity properties, which comprises heating and progressively dehydrating under vacuum a powdery mass of starch containing free moisture and a starch etherification agent and maintaining the material at temperatures below 130° C., until the material is substantially rid of free moisture and so anhydrous that substantially no moisture evaporates from it in the ensuing steps, and thereafter, while continuously stirring the dehydrated powdery material, heating it at temperatures above 130° C. in a dry non-oxidizing environment until a desired reaction product is formed and then cooling the product in such environment.

7. A process for producing starch derivatives having selected solubility and viscosity properties, which comprises heating and progressively dehydrating under vacuum a powdery mass of starch containing free moisture and a substance from the group consisting of aldehydes and aldehyde-liberating compounds and maintaining the material at temperatures below dextrinization temperatures, until the material is substantially rid of free moisture and so anhydrous that substantially no moisture evaporates from it in the ensuing steps, and thereafter, while continuously stirring and excluding oxygen from the dehydrated powdery material, heating it at substantially increased temperatures sufficient to degrade it thermally until a desired reaction product is formed.

8. A process for producing starch derivatives having selected solubility and viscosity properties, which comprises heating and progressively dehydrating under vacuum a powdery mass of starch containing free moisture and small proportions of a condensation catalyst and a substance from the group consisting of aldehydes and aldehyde-liberating compounds and maintaining the material at temperatures below 130° C. until it is substantially completely anhydrous, and thereafter, while continuously stirring the dehydrated powdery material, heating it at temperatures above 130° C. under continued vacuum until a desired reaction product is formed and then cooling the product under continued vacuum.

9. A process for producing starch derivatives having selected solubility and viscosity properties, which comprises, while continuously stirring the material in a closed container: heating under vacuum and at temperatures substantially below 130° C. a powdery mass of a finely divided starch material containing free moisture and a very small proportion of paraformaldehyde, until the material is substantially rid of free moisture and so anhydrous that substantially no moisture evaporates from it in the ensuing steps; thereafter heating the dehydrated powdery material in a dry non-oxidizing environment at substantially increased temperatures sufficient to decompose the paraformaldehyde and to degrade thermally the resulting aldehyde reaction product, until a desired reaction product is formed; and then cooling the product in such environment.

References Cited in the file of this patent

UNITED STATES PATENTS

| Number | Name | Date |
|---|---|---|
| 1,350,820 | Lilienfeld | Aug. 24, 1920 |
| 1,746,663 | Leuchs | Feb. 11, 1930 |
| 2,222,872 | Leuck | Nov. 26, 1940 |
| 2,360,477 | Dahle | Oct. 17, 1944 |
| 2,417,611 | Pierson | Mar. 18, 1947 |
| 2,516,634 | Kesler et al. | July 25, 1950 |
| 2,604,447 | Cummer et al. | July 22, 1952 |